United States Patent [19]

Blytas et al.

[11] 4,401,570

[45] Aug. 30, 1983

[54] REMOVAL OF ORGANIC CONTAMINANTS FROM WASTE WATER

[75] Inventors: George C. Blytas; Ronald K. June, both of Houston, Tex.

[73] Assignee: Shell Oil Company, Houston, Tex.

[21] Appl. No.: 382,018

[22] Filed: May 26, 1982

[51] Int. Cl.$^3$ ............................................... C02F 1/26
[52] U.S. Cl. ..................................... 210/639; 203/39; 210/909; 260/465 D
[58] Field of Search .................... 203/39, 43; 210/634, 210/639, 511, 909; 260/465 D

[56] References Cited

U.S. PATENT DOCUMENTS

| 3,835,176 | 9/1974 | Matsuo et al. | 260/465 D |
| 3,933,630 | 1/1976 | Helgorsky et al. | 210/639 |
| 4,058,526 | 11/1977 | Merz et al. | 210/634 |
| 4,110,360 | 8/1978 | Sheldon et al. | 260/465 D |
| 4,110,361 | 8/1978 | Sheldon et al. | 260/465 D |
| 4,110,362 | 8/1978 | Sheldon et al. | 260/465 D |
| 4,110,363 | 8/1978 | Sheldon et al. | 260/465 D |
| 4,123,451 | 10/1978 | Sheldon et al. | 260/465 D |
| 4,143,066 | 3/1979 | Kalcevic | 203/43 |
| 4,237,312 | 12/1980 | Stapp | 260/465 D |

Primary Examiner—Peter A. Hruskoci
Attorney, Agent, or Firm—Ronald R. Reper

[57] ABSTRACT

An aqueous alkaline waste stream containing at least organic ester having insecticidal properties is acidified and extracted with a $C_5$–$C_{10}$ hydrocarbon to reduce the organic content of the waste stream.

8 Claims, No Drawings

REMOVAL OF ORGANIC CONTAMINANTS FROM WASTE WATER

BACKGROUND OF THE INVENTION

This invention relates to a process for reducing the organics content of an aqueous alkaline waste stream containing organic esters having pesticidal properties by acidification and extraction with a $C_5$–$C_{10}$ hydrocarbon.

Aqueous waste streams containing contaminating amounts of organic compounds are generated in a variety of industrial processes, for example in the manufacture of insecticides. Before such aqueous streams can be discharged into a receiving stream, the organics content must be substantially reduced in order to meet regulatory standards. For example, the production of pesticidally active cyano-substituted carboxylic acid esters e.g. by Francis coupling, may result in an alkaline aqueous waste stream containing not only small amounts of the ester together with dissolved starting materials, but in addition alkali metal salts. These esters have prominent insecticidal and acaricidal activities, but low toxicity to mammals. Disposal of such waste streams e.g. by incineration is both difficult and expensive owing to the presence of the alkali metal salts.

SUMMARY OF THE INVENTION

A process for reducing the organics content of aqueous alkali waste water containing at least one organic ester having insecticidal properties which comprises
adjusting the pH of said water in the range from about 2.5 to about 5.5
extracting said water with a $C_5$–$C_{10}$ hydrocarbon, and separating an aqueous product having lower content of said at least one organic ester.

DESCRIPTION OF PREFERRED EMBODIMENTS

In accordance with the invention alkaline waste water containing at least one organic ester having insecticidal properties is treated to substantially reduce the organics content by acidification, extraction of the organics into certain hydrophobic hydrocarbons and separation of the extracted water.

The manufacture of pesticidally active organic esters, particularly cyano-substituted carboxylic acid esters are described, e.g. in U.S. Pat. Nos. 3,835,176; 4,110,360, 4,110,361; 4,110,362; 4,110,363 and 4,123,451 incorporated herein by reference. For example, in the manufacture of esters such as α-cyano-3-phenoxybenzyl-2,2,3,3-tetramethyl cyclopropane carboxylate or α-cyano-3-phenoxybenzyl 2-(4-chlorophenyl)-3-methyl butanoate often results in an alkaline waste stream containing organics including the esters and starting materials for their manufacture, together with alkali metal and/or ammonium salts. Typical alkali metal salts include chlorides, sulfites, phosphates and cyanides of e.g. sodium, potassium and lithium. In the event the water contains cyanide ions, they should be removed by any conventional method such as chlorination, treatment with a peroxide such as hydrogen peroxide, or hydrolysis with an aldehyde such as formaldehyde prior to practice of the present invention. The products of such treatment are either non-toxic or readily biodegradable in contrast to the refractory nature of the organics removed by the instant process to conventional biodegradation.

In the typical practice of the invention alkaline waste water containing e.g. from 10–2,000 ppmw of the pesticidal esters and up to about 18,000 ppmw of organics is charged to an acidification zone wherein acid is added to the water to lower the pH to below about 5.5 and preferably in the range from about 2.5 and 5.4, particularly in the range from 2.6–3.6. Although still lower pH's may be employed, generally these will be too corrosive and adversely impact materials of construction or require more expensive equipment. The acidification zone which may comprise one or more vessels comprised of acid resistant materials is preferably equipped with a mixing device to rapidly lower the pH to the desired range with the minimum amount of acid. Although in theory any acid may be added preference is given to strong mineral acids such as hydrochloric acid, sulfuric acid phosphoric acid and the like. Of these hydrochloric acid is most preferred since it has lower tendency to form surface active reaction products with the organics present in the waste water.

The water having a pH below 5.5 is extracted with a $C_5$–$C_{10}$ hydrocarbon. The hydrocarbon may be aliphatic, cycloaliphatic, aromatic or mixtures of these. Exemplary hydrocarbons include n-pentane, n-hexane, cyclohexane, benzene, toluene, n-heptane, methyl cyclohexane, ortho, meta- and para xylenes, n-octane, ethyl benzene, n-nonane and the like. Particularly preferred are $C_5$–$C_8$ aliphatic hydrocarbons and mixtures thereof containing less than 10% vol aromatics, especially n-heptane.

The liquid-liquid extraction may utilize co-current flow but preferably employs counter-current flow. The extraction may be conducted separately but preferably is conducted simultaneously with the acidification.

In a preferred embodiment, the extraction is conducted in two stages with intermediate separation of the organic rich hydrocarbon. In a particularly preferred embodiment the water is both acidified and countercurrently extracted with hydrocarbon followed by intermediate settling to substantially separate the organics-rich (fat) hydrocarbon, which is then removed, followed by a second counter-current extraction of the water product from the first extraction, with fresh hydrocarbon. Although it is possible to employ a different hydrocarbon for each extraction stage, for simplicity and ease of separation, use of a single hydrocarbon composition e.g. n-heptane is preferred.

The ratio at which the hydrocarbon and water are employed in the extraction step(s) have an effect on the overall efficiency of the system. The preferred ratio will depend upon the particular organics, particular hydrocarbon, and mixing efficiency, but may be easily determined by experimentation. Generally volume ratios of hydrocarbon to water in the range from about 0.2:1 to about 5:1 have been suitable, with volume ratios in the range from about 0.5:1 to 2:1 being preferred. When two-stage extraction is employed substantially equal amounts of the hydrocarbon will be employed in each stage.

Since the alkaline waste water that is to be treated by the process of the invention may contain solid or semi-solid impurities such as silica, and/or organics at concentrations in excess of their solubilities, it is advisable to remove these materials by known techniques, e.g. filtration, centrifugation, decantation and the like, prior to treatment by the process of the invention in order to improve the efficiency of the extraction step.

The process according to the invention may suitably reduce the content of pesticidal ester to below about 100 parts per billion by weight (ppbw). As a rule the process will not be applied to water containing less than about 10 or more than about 20,000 parts per million by weight (ppmw) of total organics.

After separation from the water having lowered organics content, the organics rich hydrocarbon may be regenerated, by e.g. fractional distillation, to separate an overhead stream substantially free of pesticidal ester, and which, if desired, may be recycled to the extracting step(s) to extract additional ester-containing feed water. The residual organics from the fractional distillation may be incinerated to recover the heat value thereof, or subjected to further purification for reuse.

The invention is further illustrated but is not intended to be limited by the following example.

EXAMPLE

A synthetic ester-containing alkaline water representative of the waste water from the manufacture of a pesticidal ester is prepared having the composition shown in Table 1.

TABLE 1

| Pesticidal waste water composition | % w |
| --- | --- |
| α-cyano(3-phenoxybenzyl) 2-(4-chlorophenyl)-3-methylbutanoate | 0.0050 |
| p-chlorophenyl alpha-isopropyl acetic acid | 0.8 |
| Sodium chloride | 9.1 |
| Ammonium chloride | 3.9 |
| Sodium sulfite | 6.5 |
| Sodium hydroxide | Added to raise pH of water to 9. |

One liter of the above water is placed in a two-liter separatory funnel and extracted with 800 milliliters of heptane, followed by separation of the aqueous phase. The experiment is repeated except that increasing amounts of concentrated hydrochloric acid are added to lower the pH of the waste water, prior to the heptane extraction. The extracted water is then analyzed for total organic carbon by an oxidation procedure in accordance with methods for chemical analysis of water and wastes, EPA-625/6-74-003a U.S. Environmental Protection Agency STORET NO. TOTAL 00680 (1976). Calculated results shown in Table 2 demonstrate that total organic carbon content is significantly reduced after extraction when the pH of the alkaline waste water has been reduced to the range below about 5.5.

TABLE 2

| Total Organic Carbon Content of Waste Water | | |
| --- | --- | --- |
| | pH | Total organic carbon, mg/l | Ester content*, ppm |
| Unextracted water | 9.0 | 5700 | 50 |
| After extraction | 7.0 | 4800 | — |
| | 6.0 | 450 | — |
| | 5.4 | 120 | — |
| | 3.0 | 2 | 0.08 |

*Ester content determined by gas liquid chromatographic analysis using electron capture detector on combined multiple extraction in hexane calibrated with known standard.

The ester content too is very significantly reduced according to the invention.

What is claimed is:

1. A process for reducing the total organics content of an aqueous alkali waste stream containing at least one organic ester having insecticidal properties selected from the group consisting of α-cyano-3-phenoxy-benzyl 2-(4-chlorophenyl)-3-methylbutanoate, α-cyano-3-phenoxybenzyl 2,2,3,3-tetramethyl cyclopropane carboxylate and α-cyano-3-phenoxybenzyl 2-(2,2-dichlorovinyl)-3,3-dimethyl cyclopropane carboxylate which process comprises adjusting the pH of said stream in the range from about 2.5 to 5.5 extracting said stream with a $C_5$ to $C_{10}$ hydrocarbon, by contacting in a volume ratio of hydrocarbon to water between about 0.2:1 and 5:1, and separating an aqueous product having a lower content of total organics and of said at least one organic ester than said waste stream.

2. A process as in claim 1 wherein said $C_5$–$C_{10}$ hydrocarbon is substantially aliphatic hydrocarbon.

3. A process as in claim 1 wherein the extracting step comprises counter-current contacting in a volume ratio of hydrocarbon to water between about 0.5:1 to 2:1.

4. A process as in claim 1 wherein the extracting step comprises a first extracting stage with simultaneous adjustment of pH of the waste stream in the range from about 2.6 to about 3.6, then separating the hydrocarbon extractant, followed by a second extracting stage with additional hydrocarbon.

5. A process as in claim 1 which after separating said product: comprises the following additional steps: regenerating by fractional distillation the hydrocarbon which was separated from the extracting step to recover a substantially ester-free distillate product, and then recycling said distillate product to the extracting step of claim 1.

6. A process as in claim 1 wherein said waste stream contains 10–20,000 ppmw of organic compounds.

7. A process as in claim 1 wherein said waste stream contains at least one cyano-substituted carboxylic acid ester.

8. A process as in claim 1 wherein said waste stream contains from 1–10% w of inorganic salts of alkali metals.

* * * * *